United States Patent [19]

Hamlin et al.

[11] Patent Number: 4,582,421

[45] Date of Patent: Apr. 15, 1986

[54] COPYING MACHINE WITH ROTARY SORTER AND ADHESIVE BINDING APPARATUS

[75] Inventors: Thomas J. Hamlin; William B. Edwards, both of Macedon, N.Y.

[73] Assignee: Xerox Corporation, Stamford, Conn.

[21] Appl. No.: 684,771

[22] Filed: Dec. 21, 1984

[51] Int. Cl.[4] .......................... G03B 27/58; B65C 9/00

[52] U.S. Cl. ...................................... 355/72; 156/567; 271/291; 271/295; 355/3 SH; 355/14 SH

[58] Field of Search .................. 355/3 SH, 14 SH, 72; 156/563, 578, 364, 567, 568; 270/58; 271/314, 315, 291, 295; 412/37

[56] References Cited

U.S. PATENT DOCUMENTS

| | | | |
|---|---|---|---|
| 2,876,008 | 3/1959 | Mestre | 271/295 |
| 3,851,872 | 12/1974 | Gerbasi | 271/291 |
| 4,145,038 | 3/1979 | Mol | 270/58 |
| 4,500,241 | 2/1985 | Peters et al. | 156/567 X |

FOREIGN PATENT DOCUMENTS 1436096 1/1969 Fed. Rep. of Germany .

*Primary Examiner*—Richard A. Wintercorn
*Attorney, Agent, or Firm*—Bernard A. Chiama

[57] ABSTRACT

A finishing station is disclosed as having a rotary sorter arranged to receive a stream of sheets at a loading station and to collate them into booklets or copy sets. An adhesive binder is positioned at an unloading station and is arranged for movement toward and away from the edges of the booklets while still in the sorter bins of the sorter. When moved toward the edges of the booklets, an applicator roller in the binder is arranged to apply adhesive material to the edges in timed sequence relative to sheet loading.

6 Claims, 12 Drawing Figures

COPYING MACHINE WITH ROTARY SORTER AND ADHESIVE BINDING APPARATUS

This invention relates to improved finishing systems, and in particular, for such systems which are integrated into high speed copiers and reproduction machines.

Companion U.S. patent aplications to the above-entitled application, and filed on even date herewith, are as follows: Ser. No. 684,814, entitled "Copying Apparatus With Finisher"; Ser. No. 684,812, entitled "Copying Machine With Rotary Sorter and Stapling/Stitcher Apparatus"; Ser. No. 684,772, entitled "Copying Machine With Rotary Sorter Having Sheet Gripping Devices"; and Ser. No. 684,813, entitled "A Finishing Apparatus With a Rotary Sorter and an Adhesive Binder".

With the advent of higher speed and more sophisticated copy producing machines, printing presses, and the like, considerations as to how the mass of copies generated can best and more effectively be handled has assumed increasing importance. One way has been to provide a reproduction system with an input device in the form of a recirculating document handling apparatus. In this system, a document sheet is removed from a collated set of document sheets, placed on an exposure platen for exposure at the rate of one exposure for each document sheet, and returned to the top of the set in the document handling apparatus until the set of document sheets has been completely circulated through the apparatus, and a copy set has been produced. The set of document sheets is then recycled for the reproduction of a second copy set, and so on. After each copy set is individually produced and collected at a collection station, a finishing device such as a stitcher or stapler is activated to bind the set. These systems are of the precollation type wherein the document sheets are precollated in the document handling apparatus prior to commencement of a reproduction run. The output for the reproduction machine will likewise be precollated in sets corresponding to the sequenced numbered document set in the document handling apparatus. The copy sheets are collected in collated sets as they are sequentially produced so that binding may be effected without the interaction of additional devices. Such systems are described in U.S. Pat. No. 4,134,672.

The disadvantage in these systems having a complete document recirculation for the production of each bound copy set is that the speed of production is limited to the mechanical limitations in the speed of handling document sheets in the document handling device. It necessitates that the input device, the document handler, be of extreme high reliability as it places the original document sheets under the severe stress of being constantly recirculated. In practice, for these systems, there appears to be a threshold in the production rate of finished copy sets. The failure rate in the document handling apparatus increases beyond acceptable limits when too high a speed of document sheet movement in the apparatus is attempted.

In order to achieve still higher rates of production of finished copy sets, another reproduction system has evolved which utilizes post-collation rather than precollation. Such a system is disclosed in U.S. Pat. No. 4,444,491. The arrangement disclosed in this patent utilizes a document handling apparatus wherein a predetermined number of light images is produced for each document sheet, say for example, of page one of a multipage document, before a successive document sheet, perhaps page two of the document, is likewise imaged. This sequencing in turn is repeated many more times when a very large number of copy sets is to be reproduced. In this manner, the mechanical movements involved in document handling are held to a minimum.

As the copy sheets are being produced in accordance with the above imaging procedure, a single array of vertically oriented collecting bins or sorter is positioned and vertically moved in either direction to receive a copy sheet output for collating the copy sheets into collated sets. The bin array or sorter in effect serves as a buffer in the production of finished copy sets. As these sets are being produced, a finishing device such as a stitcher or stapler is positioned and activated to apply a staple to each set as they are completed. With this arrangement, better than previously available throughput is achieved from the various apparatus utilized in the reproduction system having finished capability. However, complete and uninterrupted throughput is not available with this system since there are some machine pitches or copy cycles lost to accommodate various positionings of the sorter array. In addition, the use of a linear array of collecting bins limits the reproduction system to either a stapler/stitcher or to an adhesive binder, rather than permitting the incorporation of both without undue costly fabrication, and more important, requires the use of complicated copy set transports which adds more sheet handling to the system.

In the prior art, a variety of rotary sorters have been disclosed, but these have been directed mainly to aspects of the sorter structure per se, and not to the arrangement with either a stapler/stitcher or an adhesive binding device, or in combination with a copier or printing machine to produce a system wherein ultimate throughput is achieved with either stapling/stitching or adhesive binding, and if in combined use, their selectivity. In U.S. Pat. No. 3,851,872, a simple rotary sorter is disclosed as being arranged for simplex or duplex sheet collection. There is no provision for binding, not permitting continuous rotation of the sorter during sheet collection utilizing all of the bins continuously. In U.S. Pat. No. 2,876,008, a large rotary collating apparatus is disclosed as being tilted at an angle so as to permit continuous use of all of the bins at one time, and which, upon rotation of the drum, produces agitation to job the copy sheets into registration along two edges. In U.S. Pat. No. 4,145,038, a rotary collator-sorter is disclosed which is devised so as to be selectively usable as either a collator or as a sorter. A rotary sorter is disclosed in the German Pat. No. 1,436,096, dated Jan. 30, 1969, as being associated with a single sheet feeder and an output feeder. In none of these prior art disclosures is there association with a binding device.

It is therefore the principal object of the present invention to produce bound sets or stacks of copies of a multi-page document at the highest speed possible for a reproduction machine.

It is a further object of the present invention to increase productivity in a reproduction/finishing system by simultaneously collecting sequenced sheets and binding the same at their collected stations.

It is another object of the present invention to reposition an array of collecting bins sequentially in a direction wherein successive bins in the array will receive a copy sheet at a fixed point thereby collecting sets of collated copy sheets, and wherein the collected sets are positioned at another point for binding.

The present invention includes a finishing station having an adhesive applying device for selectively binding copy sheets received in succession at a sheet binding position comprising a rotary bin array, having a series of individual bins each with an inlet for receiving individual sheets at a fixed sheet loading station; means supporting the bin array for rotary movement for disposition of a selected one of the bins at the sheet loading station for loading of sheets therewithin; drive means adapted when actuated to rotate the array during the collection of sheets in collated fashion; set retaining or clamping means for holding collected sheets within the bins as the array rotates; an adhesive applying means movable toward and away from the bins, and controls for the above.

The finishing station in the form of a sorter/finisher may also be utilized in an office environment as a stand alone system. The concept of the finishing aspect of the present invention resides in its ability to register, clamp, finish, and automatic unload of books at a very reasonable cost while maintaining a high degree of production quality.

Other objects and advantages will be apparent from the ensuing description and drawings in which.

Figure 1:
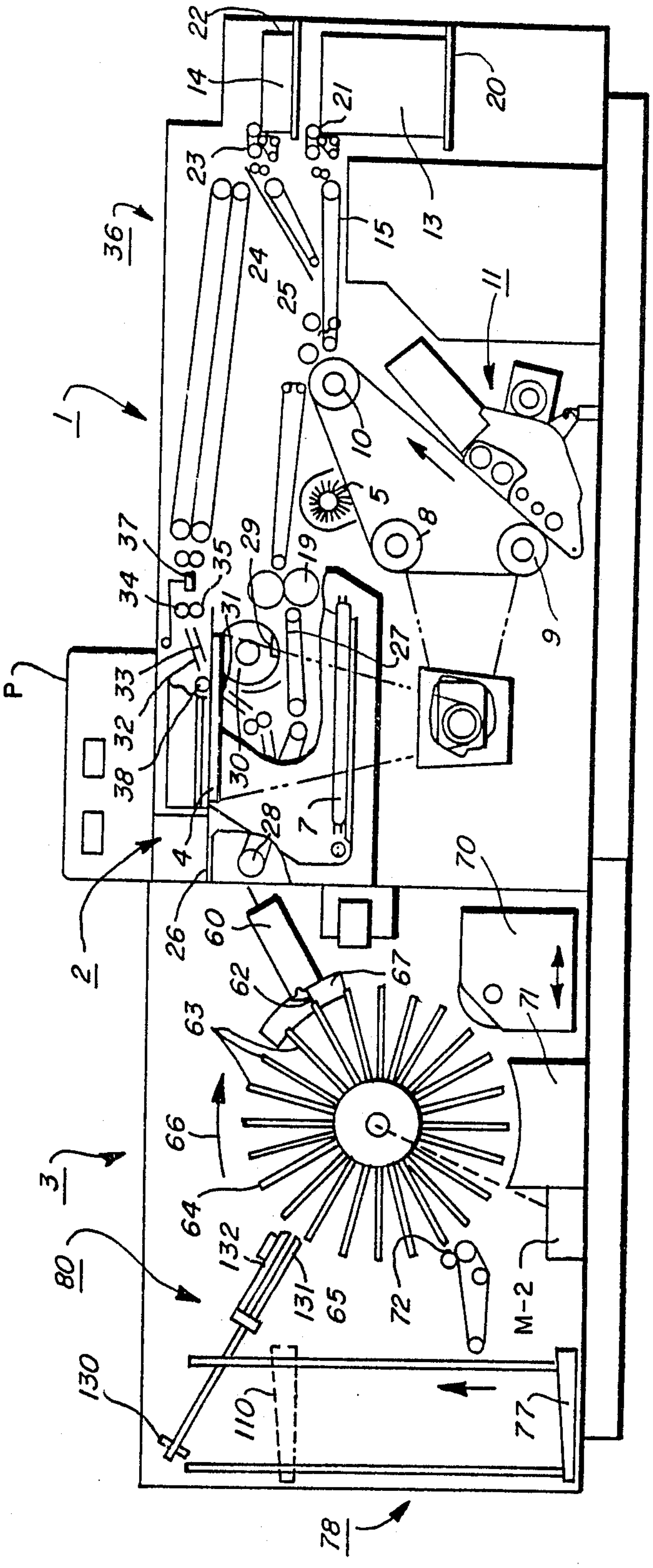
FIG. 1 is a schematic illustration of a configuration of an electrostatographic printing/finishing system employing the present invention.

For a general understanding of a reproduction system with which the present invention may be incorporated, reference is made to FIG. 1 wherein components of a typical electrostatic printing/finishing system are illustrated. The printing function of the system is preferably of the xerographic type as one including a xerographic processor 1, and a document handling apparatus 2. Preferably, the processor 1 is the same as the processor in the commercial embodiment of the Xerox duplicators, models 9400® and 9500®, which utilize flash, full frame exposure, for very high speed production. Similarly, the document handling apparatus 2 is the same as those used in the same machines. It will be understood that most any other type of xerographic processor and multiple exposure document handling apparatus may be utilized. Operating in conjunction with the processor 1 and apparatus 2 is a finishing module 3 and thereby forms the reproduction system shown in FIG. 1.

As in all xerographic systems, a light image of an original to be reproduced is projected onto the sensitized surface of a xerographic photosensitive surface to form an electrostatic latent image thereon. Thereafter, the latent image is developed with toner material to form a xerographic powder image corresponding to the latent image on the photosensitive surface. The powder image is then electrostatically transferred to a record material such as a sheet of paper or the like to which it may be fused by a fusing device whereby the powder image is caused to adhere permanently to the surface of the record material.

The xerographic processor 1 is arranged as a self-contained unit having all of its processing stations located in a unitary enclosure or cabinet. The processor includes an exposure station at which an original to be reproduced is positioned on a glass exposure platen 4 for projection onto a photosensitive surface in the form of a xerographic belt 5. The original or set of individual document sheets are selectively transported by the document feed apparatus 2 one document sheet at a time to the platen 4 for exposure. After a predetermined number of exposures of each document sheet is made, the same is returned to the top of the set until the entire set has been copied. A suitable document handling apparatus of this type is described in U.S. Pat. No. 3,944,794, commonly assigned, which is hereby incorporated by reference.

Imaging light rays from each of the document sheets, which is flash illuminated by an illumination system 6 having suitable lamps 7, are projected by means of a lens system and mirrors, onto the xerographic belt 5. The lamps 7 are connected to a suitable flashing circuit (not shown) which is controlled by the programmer for the processor in timed sequence, and in accordance with the program the operator has preset in the machine. Further details in this regard are not necessary since the Xerox 9400® reproduction machine operates in this manner and is well known. The xerographic belt 5 is mounted for movement around three parallel arranged rollers 8, 9, 10, suitably mounted in the processor 1. The belt is continuously driven by a suitable motor (not shown) and at an appropriate speed. The exposure of the belt to the imaging light rays from a document discharges the photoconductor layer in the area struck by light whereby there remains on the belt an electrostatic latent image corresponding to the lght image projected from the document. As the belt continues its movement, the electrostatic latent image passes a developing station at which there is positioned a developer apparatus 11 for developing the electrostatic latent image.

After development, the powdered image is moved to an image transfer station 12 where the developed image is transferred to a support surface, normally a sheet of copy paper, brought from a main or auxiliary paper tray 13, 14, respectively, as will appear.

Each sheet is conveyed to the transfer station by a conveyor 15, which cooperates with sheet registration fingers 16 (only one shown). These fingers rotate in a counterclockwise direction, and engage the leading edge of a sheet, being adapted to effect the accurate timing and positioning of a sheet relative to the movement of a developed image on the belt 5 and the other timed events in reproduction processing. Futher details of the timing relationships and related structure and events are described in U.S. Pat. Nos. 3,790,270; 3,796,486; and 3,917,396, commonly assigned, and which are incorporated herein by reference.

The sheet is moved in synchronism with the movement of the belt 5, and passes between a transfer roller 17 and the belt 5 at the transfer station. After transfer, the sheet of paper is stripped off the belt 5 and transported by a vacuum conveyor 18 in an inverted condition to a fusing station where a fuser device 19 is postioned to receive the sheet of paper for fusing the powder thereon. After fusing, the sheet is eventually transported to a finisher station to be described hereinafter either to be stapled/stitched, or bound by adhesive material into copy sets or merely to be separated into sets without binding.

The system comprising the processor 1, the document handling apparatus 2, and the finishing module 3 is under control of a programmer P which permits an operator various options: to turn the entire system ON or OFF; to program the reproduction system for a desired number of reproductions to be made of each original document sheet or set; to select whether simplex or duplex copies are to be made; to select a desired output arrangement, that is, sets mode or stacks mode, stapled, or unstapled; to select one of a plurality of paper trays, to condition the machine for the type of document, that is, whether one-sided or two-sided; to select a copy size reduction mode, and other desirable functions. The programmer P also includes a controller which provides all operational timing and synchronization between the processor 1 and all of its xerographic processing functions, and system control functions, the automatic events to be described hereinafter. The controller may include any suitable microprocessor having a CPU and the appropriate machine clock, but preferably the processor is one similar to the Intel 8080 microprocessor manufactured by the Intel Corporation, Santa Clara, Calif., and having sufficient ROM's and RAM's for all of the necessary functions in the reproduction system.

As previously stated, copy sheets are supplied from either the main paper tray 13 or the auxiliary paper tray 14. Main paper tray 13 includes a suitable elevator type base 20 on which a supply of sheets rest, base 20 being supported for automatic up and down movement by suitable means (not shown) designated to maintain paper feed belt 21 in operative contact with the topmost one of the sheets on the elevator 20. The belt 21 is operated intermittently in timed relationship to spacing of images on the photoreceptor belt 5 and serves to advance the topmost sheet from the supply stack 13 to the main paper supply transport 15.

The auxiliary tray 14 in the exemplary arrangement shown, is arranged above main tray 13 and includes a suitable elevator type base 22 on which a supply of sheets may be provided. As with the main supply tray 13, suitable means (not shown) are provided to raise base 22 of auxiliary tray 14 as the supply of sheets thereon is used up so as to maintain the paper feed belt 23 in operative contact with the topmost sheet. The paper feed belt 23, which is intermittently driven in the same manner as main tray feed belt 21, advances one sheet at a time to an auxiliary paper supply transport 24. The transport 24 is suitably driven by a drive system not shown and is disposed to dicharge sheets drawn from auxiliary tray 14 onto the operating run of main supply transport 15. The sheets from auxiliary tray 14 are thereafter fed to the transfer station. Guides 25 serve to maintain the sheets in driving contact with the auxiliary paper supply trasport 24 during movement therealong.

During use, copy sheets leaving the processor 11 after exiting the fuser apparatus 19 are conveyed to an exit slot 26 by way of transports 27, 28 if the reproduction system is set for the simplex or one-sided copying. If the system has been programmed for duplex or two-sided copying, copy sheets will be directed to the auxiliary tray 14. If the latter mode of operation is selected, copy sheets conveyed by the transport 27 are intercepted by a deflector 29 which is adapted for movement into the sheet path. When the deflector 29 is in the interrupt function, the copy sheets are carried around a roller 30 and through the nip formed by this roller and a cooperating roller 31. The sheet is advanced by rollers 30, 31 between an upper sheet guide baffle 32 and a lower sheet guide baffle 33 to a second roller pair 34, 35 which further advances the sheet to a transport mechanism 36 which carried the sheet to the auxiliary paper tray 14. When the desired number of one-sided copies have been produced and delivered to the tray 14, the paper handling mechanism for the main tray 13 may be inactivated and the paper handling mechanism for the auxiliary tray 14 activated. It should be understood that in following the paper path around roller 30 and between roller pair 34, 35, the copy sheets are turned over, i.e. the printed material is on the top of the sheets in the tray 14.

Upon reenergization of the system, the sheets from the tray 14 are fed through the reproduction machine by means of the feed belt 23 and the transport 24 for copying on the blank side of the sheet in the same manner as described heretofore. With the reproduction system being programmed for the duplex mode, and after completion of the correspondingly programmed number of one-sided sheets, reenergization of the system also produces the raising of a sheet stop 37 into the paper path between the upper guide baffle 32 and the lower guide baffle 33. The feed roller 34 is mounted on the upper baffle 32 to be raised therewith during the phase of duplex copying. In this manner, the feed roller 34 will be displaced away from lower feed roller 35 so that papers fed therebetween are not forwarded thereby.

The sheet stop 37 is formed of a ring-shaped resilient material being compliant enough to resume its circular shape and thereby effect the insertion of a sheet into the nip formed between roll 31 and a cooperating roll 38, the trailing edge of the sheet being carried by roll 31 into the nip. The rolls 31 and 38 are formed of a high friction material such as polyurethane foam to assure positive feeding of a sheet traveling toward stop 37 and positive feeding of the sheet traveling away from stop against drag force generated between two sheets which may be in the inverter area at the same time traveling in opposite directions. The purpose of the stop 37 and the cooperating action of the rollers 31, 38 is to invert each copy sheet, while production is in the duplex mode, so that the odd numbered page on a copy sheet reaching the exit slot 26 is on the bottom of the sheet.

Figure 2:
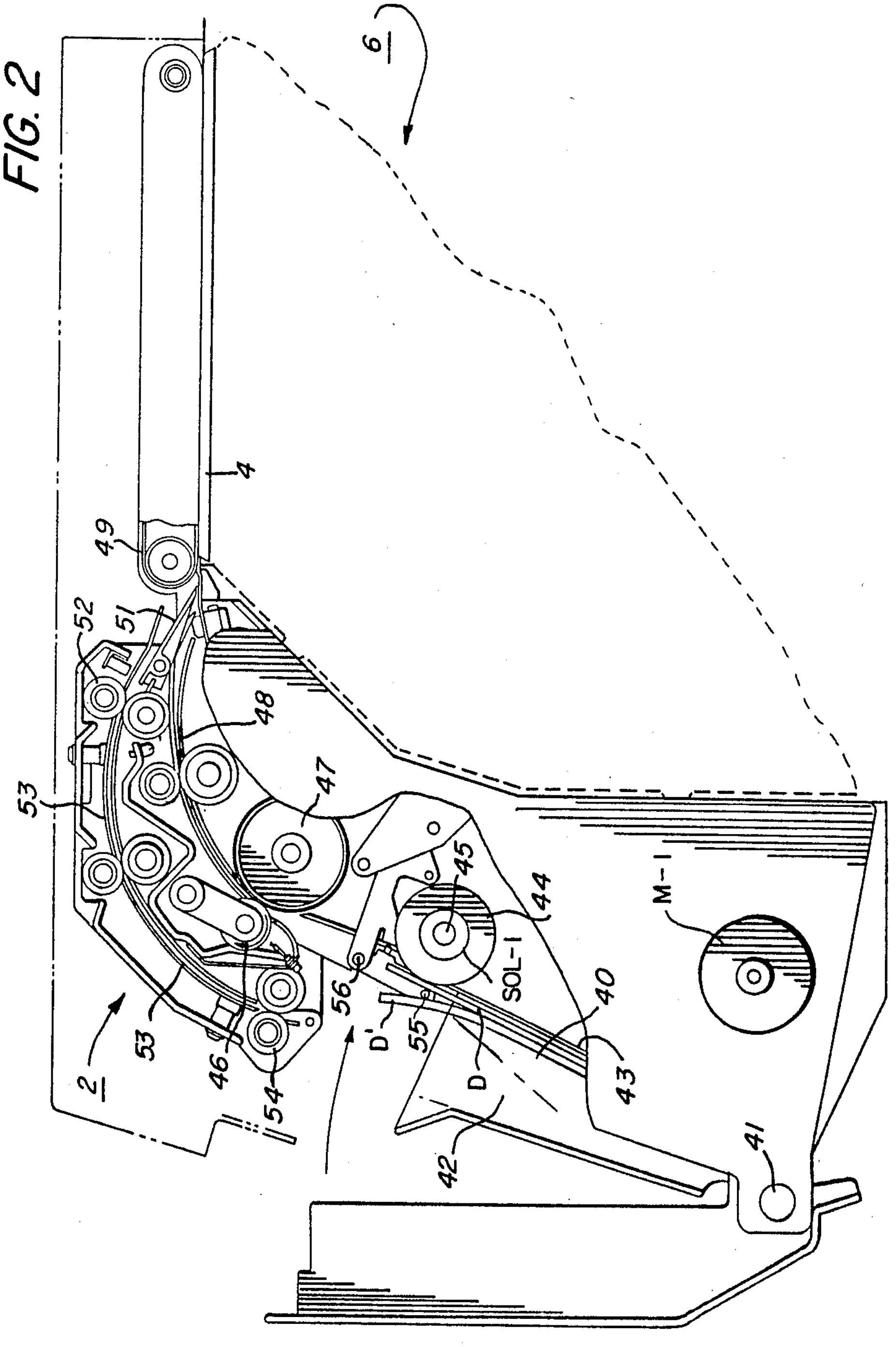
FIG. 2 is an elevational view of the document handling apparatus utilized in the printing system of FIG. 1.

As shown in FIG. 2, the document handling apparatus 2 serves to feed one document sheet at a time from a supply of document sheets D into copying position on the platen 4 where a single exposure if only one copy set is programmed, or a plurality of exposures may be made. Following exposure one or more times, each document sheet is automatically returned to the document supply and the next document sheet, if any, is brought into the exposure position on plate 4. As will appear, document sheets returned to the supply stack may be recycled by the apparatus 2 or simply removed by the user when the copying program is completed.

The document handling apparatus 2 includes base section 40, the lower end of which swingably supports, by means of a shaft 41, matching left and right hand tray members 42. The tray members 42 are substantially U-shaped when seen in cross section, each having a base 43, which are shown cut away at the upper ends thereof to accommodate a document separator/feed roll 44. The trays are adjustable along the shaft 41 to accommodate various size documents.

The document separator roller 44 is rotatably supported on a drive shaft 45 under the base section 40 such that a portion of the periphery of the roller projects into the document tray area, the base 40 being suitably apertured to accommodate the separator roller. The shafts 45 is supported for rotation and driven by a continuously driven motor M through suitable pulleys and belts (not shown). A solenoid clutch SOL-1 drivingly connects the motor M to the separator 44 in response to a signal from the machine logic in timed sequence in accordance with the programming arrangement in the logic.

A pair of document limiting rollers 46, 47, are disposed on the downstream side of separator roller 44 and function to prevent passage of more than one document sheet at a time. The upper limiting roller 46 is arranged to be driven by the lower limiting roller 47 so long as friction developed between rollers 46, 47 remains above a predetermined setting. In the event of a decrease in roller friction, as occasioned by an attempt of two superimposed document sheets to pass therethrough, the upper roller 46 is turned in a document rejecting direction by a suitable drive means (not shown). Document sheets emerging from limiting rollers 46, 47 are carried forward by intermediate rollers underneath a curved document guide 48 to a platen transport belt conveyor 49 which, in turn, carries the document onto the platen 4.

A register edge 50 is provided across the inlet side to platen 4, and serves to register or locate document sheets in pre-set position on platen 4 for exposure thereof. The movement of the platen transport belt 49 is reversed for this purpose after the document sheet has been carried past the register 50, reversal of transport 49 serving to move the document sheet backwards to bring the document sheet trailing edge into abutment with register edge 50. When exposure is completed, the platen transport belt 49 is again operated in reverse to move the document sheet backwards off the platen 4, the register edge 50 being retracted for this purpose by a suitable means (not shown). The document guide fingers 51 deflect or guide the returning document upwardly into the nip of a first return transport roller pair 52, which carry the returning document sheet between return guides 53 and into the nip of a second return transport roller pair 54 and back into tray members 42.

To maintain the returned document sheets which have been designated for convenience by the letter D′, segregated from document sheets D awaiting feeding and prevent inadvertent refeeding of returning document sheets D′ by the primary feed roller 44 following feed of the last one of the original document sheets, a displaceable bail or separator bar 55 is provided substantially opposite to and above the feed roller 44. The bar 55 is supported from a rockable cross shaft 56 which is suitably journaled in the supporting framework of document apparatus 2. Means (not shown) are provided to selectively turn the shaft 56 and raise the bar 55 out from under the document sheets D′ resting thereupon and thereafter return the bar 55 back onto the topmost one of the document sheets in the supply. All of the rollers heretofore described are driven by the motor M by way of suitable pulleys and belts (not shown). Since the particular document apparatus 2 is a commercial device being a part of Xerox Corporation's product labeled the 9200® duplicator, and is adequately described in U.S. Pat. No. 3,944,794, further description thereof will not be included herein.

Furthers details of the processing devices and stations in the printer system or processor are not necessary to understand the principles of the present invention. However, a detailed description of these processing stations and components along with other structures of the machine printer are disclosed in U.S. Pat. No. 4,054,380 which is commonly assigned with the present invention and which is incorporated by reference herein.

As previously described, the document apparatus 2 includes a document tray adapted for supporting a stack comprising a plurality of document sheets in numbered sequence with page one of the multi-page document on the bottom of the stack. Since the illustrated document handling apparatus is of the bottom feed type, page one will be the first document sheet imaged, and so on.

For either simplex or duplex modes of operation, copy sheets exiting the fuser device 19 are directly conveyed by the transports 27, 28 to and through the exit slot 26 positioned at one end of the housing for the xerographic processor 11. As sheets exit the slot 26, they are directed to the finishing module 3 which comprises a rotary sorting mechanism, a stapler/stitcher apparatus, an adhesive binding device, and an output elevator/conveyor system. After leaving the processor 1, as shown in FIG. 1, each sheet is directed to a transport 60 within the finishing module 3.

The transport 60 includes a registration device (not shown) which provides rear edge registration of the sheets so that each sheet is programmed or placed in timed sequence relative to the ensuing sorting function. In leaving the registration device in timed sequence at sheet receiving station 62, the sheets are directed seriatim into the bins 63 of a rotary sorter 64 driven by a motor drive M-2 connected to a supporting shaft 65. The drive and control system therefor is adapted to impart indexing rotary motion successively or continuously to the sorter, as will be described below.

During the normal collating sequence, the sorter rotates in the direction indicated by the arrow 66. While a sheet is being directed into a bin 63, and the sorter 64 is indexed to position the next succeeding bin adjacent the sheet receiving station 62, the sheet or sheets in the previous bin will be operated upon by a tamping device 67. Each sheet entering a bin is tamped so as to insure corner registration of a finished copy set just prior to a stapling/stitching or adhesive binding action, as will be described below.

As the rotary sorter 64 continues its indexing rotation, the next operating station after the tamper 67 is an adhesive binder station whereat an adhesive binder 70 is arranged for effecting the application of hot adhesive material to the spine of completed copy sets or booklets, if this operation has been programmed in the programmer P by the operator, and when all of the programmed copy sheets have been collected in the bins.

Continued rotation of the sorter 64 brings the adhesive bound copy sets, if such has been programmed, to a station whereat a cooling device 71 is positioned for cooling the still hot adhesive material. Preferably, the device comprises a fan and a manifold having discharge openings arranged to span the openings of at least two of the sorter bins 63 and running axially of the sorter 64. This arrangement provides sufficient cooling of the hot adhesive material on the spline of the copy sets or booklets in the bins. Still further rotation of the sorter brings the indexing bins to a discharge station 72 whereat finished copy sets are unloaded after stapling, adhesive binding, or as unbound copy sets.

At the station 72, an unload transport system is positioned (see FIG. 5) comprising a nip roller pair 73, 74, and a belt 75 entrained around a drive shaft 76 for driving the rollers 73, 74. The rollers 73, 74 are made of very compliant foam material to permit the transport through the nip of copy sets ranging between two sheets to fifty sheets without deforming the copy sets or causing undue wear of the rollers. From the transport system, copy sets are directed to the platform or tray 77 of an elevator 78 arranged for vertical motion in either direction by a pair of elongated screws 79.

The next and final finishing station along the path of bin movement is a stapler device 80 suitably mounted on the frame of the apparatus 3 for pivotal movement in a plane inclined relative to a horizontal plane. The device 80 is mounted at the end of the sorter 64 and, when activated, is pivoted inwardly to a corner of the registered copy sets or booklets within the bins 63.

Figure 4:
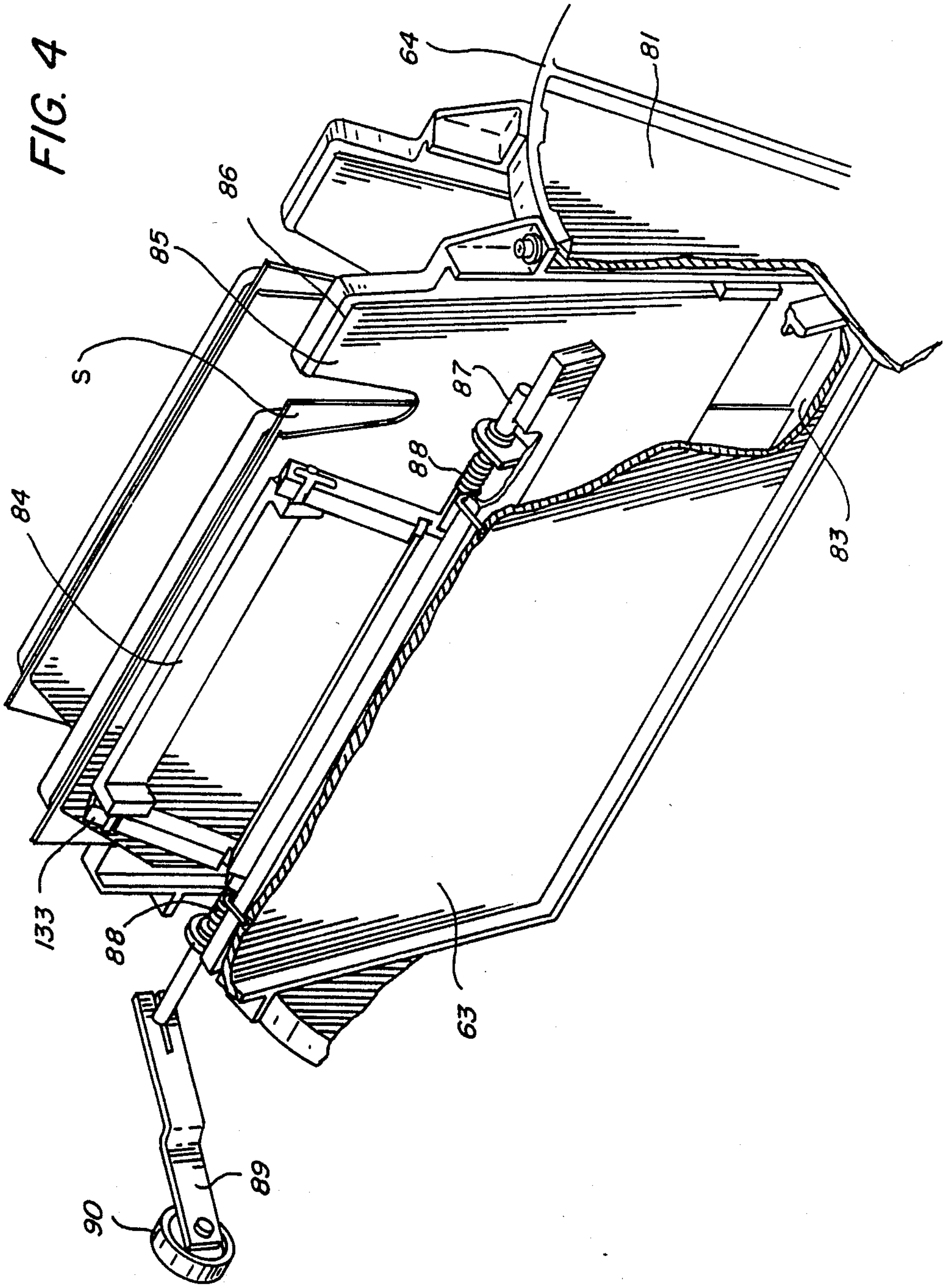
FIG. 4 is an isometric view of the sheet gripping mechanism.

The sorter 64 comprises circular front and rear end plates 81, 82, respectively, (see FIG. 4) to which the bin plates 63 are attached in radial configuration. The inner edge of each of the bin plates 63 is formed with bottom registration edge 83 against which sheets come to rest when inserted into the bins. As each sheet is transported into the bins, they are impelled therein by the transport 60 and, in conjunction with the tamping device 67, become registered against the registration edge 83. The tamping device 67 cooperates with the edge 83 to effect corner registration of each copy set or booklet being assembled in the bins.

Each of the bins 63 has a copy set gripper bar mechanism associated therewith for holding copy sheets within the respective bins during rotation of the sorter 64. The gripper bars are opened to permit ingress of sheets into the bins when at the loading station 62, and the unloading station 72 by a bin opening/closing actuating mechanism associated with the gripper bars as the affected bin approaches the respective station. The gripper bar mechanism serves to hold the copy sheets in registered condition as the sorter rotates during a reproduction run, and to prevent displacement of the sheets when the bins are in inverted positions.

Figure 3:
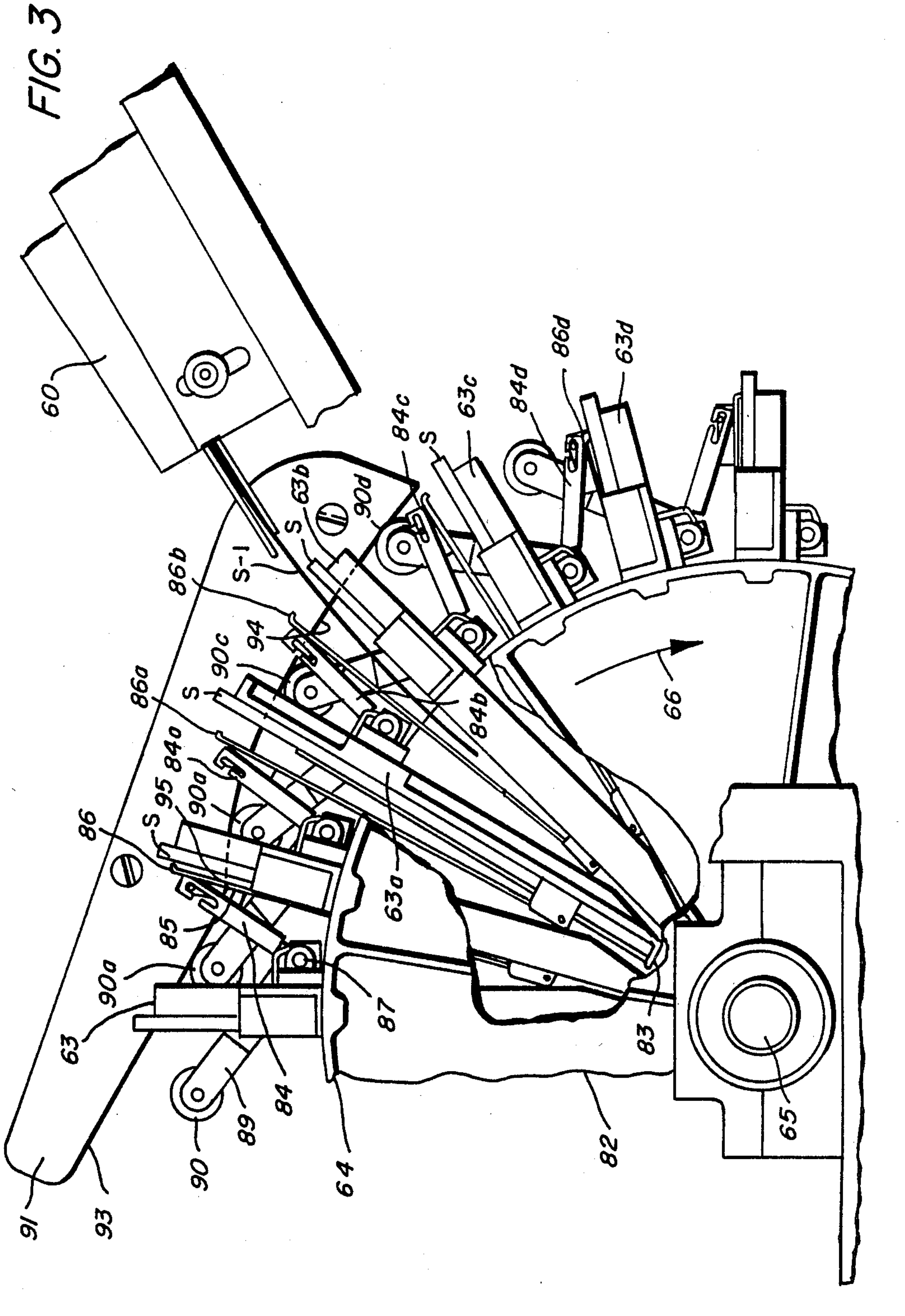
FIG. 3 is a partial elevational view of the loading station showing the sheet gripping mechanism.

As shown in FIG. 3, each of the bins has positioned therein a gripper bar 84 extending the length of the bin axially of the sorter 64. Since all of the bars and their associated opening and closing mechanisms are identical, only one will be described in detail. Each bar includes a plate member 85 which extends into a bin being pivotally retained at its lower end on a bin plate 63 and at its upper end to a gripper bar so as to permit smooth translational movement of each plate member 85 away from and against the sheets in each bin, during actuation of a gripper bar. The outer edge of each plate member is turned to form a gripper edge 86 and when in gripping condition, engages the sheet(s) along the longitudinal edge thereof adjacent the opening of its respective bin. The bar 84 is pivoted on a rod 87 extending parallel to the axial shaft 65 and secured to suitable castings or brackets on the frame for the sorter to permit rotation of the bar into and out of gripping positions. A coil spring 88 at each end of the rod 87, each having an end secured to the gripper bar and the other end secured to the bin plate 63 serves to bias the bar 84 normally clockwise, as shown in FIG. 3, to force the plate member 85 against the sheets 5 and the gripper edge 86 into gripping or retaining position with the sheets. Extending approximately 90° from the bar 84 at the pivoted edge thereof and positioned adjacent the rear plate 82, is a crank arm 89 secured to the bar. The end of the arm remote from the pivot rod 87 supports a roller 90 arranged for rotation on a pin secured to this end.

Figure 5:
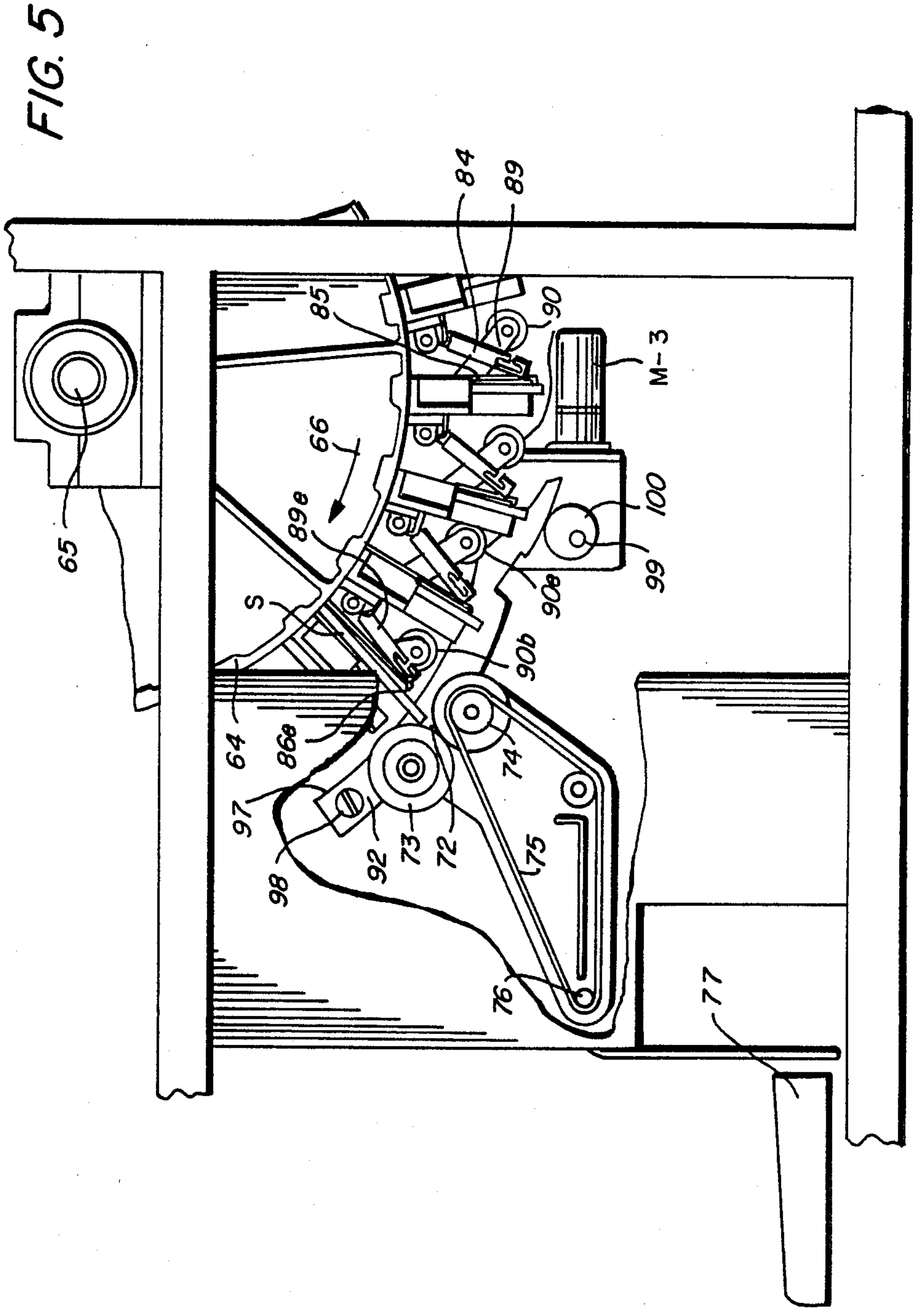
FIG. 5 is a partial elevational view of the unloading station showing the release mechanism for the gripper mechanism.
Figure 6:
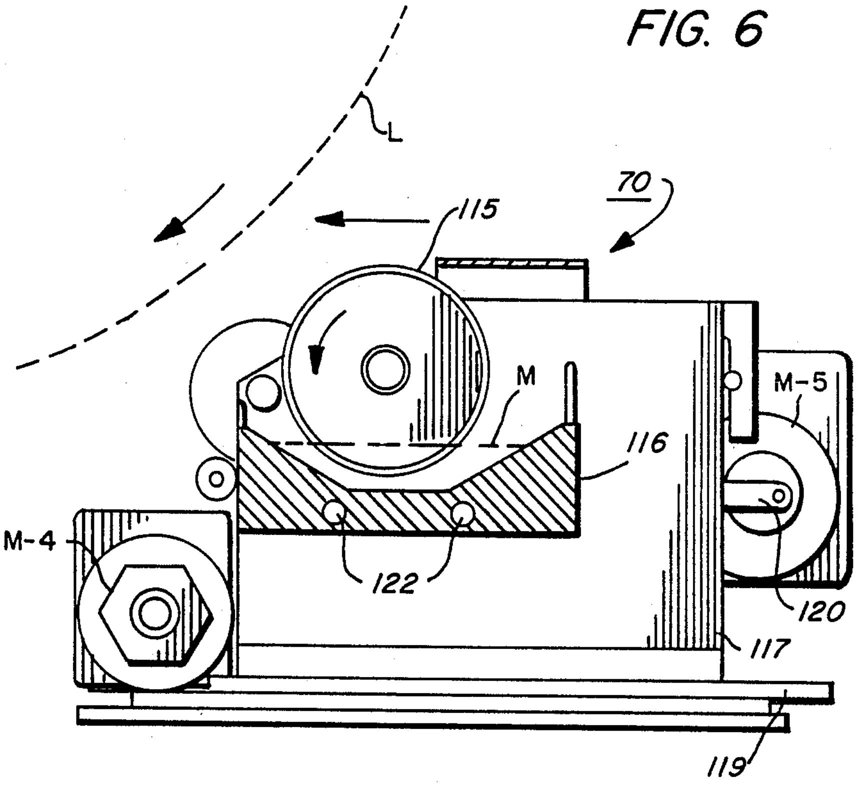
FIG. 6 is an elevational view of the adhesive binding device.

The rollers 90 for all of the gripper bars, one for each bin in the sorter 63, are adapted to engage two cam control devices arranged at the rear of the machine adjacent the rear plate 82 and spaced peripherally of the sorter. One of the cam devices is illustrated in FIG. 3 by the reference numeral 91 as being operative on the gripper bars when the same are adjacent the loading station 62 for the finishing apparatus and the other cam device illustrated by the reference numeral 92, in FIG. 5, is operative on the gripper bars when the same are adjacent the unloading station 72.

The cam device 91 is formed with two cam surfaces 93, 94 engagable with the rollers 90 and separated by a projection or high point 95 for the joint cam surfaces. The cam surface 93 serves to drive the gripper bars 84 and consequently the associated gripper edges 86 counterclockwise, out of engagement with the sheets, against the bias of the springs 88. The sequence of this operation is as follows.

As the sorter 64 rotates in the direction of the arrow 66, one of the gripper actuating rollers **90*a* contacts the cam surface 93 which is sloped toward the high point 95. Continued rotation causes the roller 90*a* to ride higher on the surface 93 to initiate counterclockwise rotation of the associated gripper bar 84*a* and, consequently, release of the gripper edge 86*a* from the sheets in the affected bin 63*a*. Further rotation of the sorter beyond the position shown in FIG. 3 carries the roller 90*a* over and beyond the high point 95 which produces the greatest separation of the edge 86*a* from the sheets S. At this event, a sheet of paper $S_1$ starts its movement from the transport 60 into the affected bin 63*b* to which the affected gripper bar is associated. As shown in FIG. 3, the roller 90*b* has been carried beyond the high point 95 and upon the cam surface 94; however, the return movement of gripper edge 86*b* is just beginning since the portion of the cam surface 94 from engagement of the roller 90*b* to the high point 95 is effectively a dwell cam action producing very little return movement. Therefore, in this position of the parts, the sheet $S_1$ has progressed a little further in the bin 63*b*. Still further rotation of the sorter carries the roller 90*c* further along the cam surface 94, which is shaped to permit clockwise return rotation of the gripper bar 84*c* and the edge 86*c* toward the sheets S in the bin 63*c*. Finally, still further rotation of the sorter moves the roller 90*d* toward the end of the cam surface 94 thereby effecting complete return of the gripper bar 84*d* and the edge 86*d* against the sheets in the bin 63*d***.

In the foregoing sequence, at least three bins 63 have their associated gripper bars separated from sheets contained therein. This permits adequate spacing and timing for the tamper 67 to effect corner registration of the sheets contained in the bins. By having at least three unobstructed bin openings, there is assurance that each sheet will have sufficient time to enter each bin and be registered. In addition, the mechanical action in this lengthy sequence lessens the chances of jams caused by the mis-timing of sheet arrival or, as a result of machine tolerances.

The rotary sorter 64, during a reproduction job, continues to rotate in the direction of the arrow collating the stream of sheets entering the sorter until the job is completed, if the programmed number of copy sets or booklets is less than the number of bins, preferably 24 bins, or will discontinue collecting sheets when the 24 bins are all occupied with complete booklets. Upon this occurrence, depending upon which of the type of binding actions has been programmed, adhesive binding or stapling/stitching, the sorter will rotate in the same manner as when collating to bring each booklet to either the adhesive binding device 70 or the stapler/-stitcher 80. To maintain productivity, a binding action is initiated as soon as a booklet is completed and has been moved into a binding position, even as the last sheet of each booklet is being received in the sorter bins.

As previously stated, the cam device 92 is associated with the discharge or unload station 72 for controlling the discharge of bound sets of sheets. As shown in FIG. 5, the cam device 92 is formed with a cam surface 97 against which the gripper mechanism rollers 90 are directed when the device 92 is in the path of movement of these rollers and in a position to intercept the same. The device 92 is pivoted on a pivot 98 and is actuated into and out of the path of the movable rollers 90 by a motor and drive M-3 which is under control of the programmer P for the machine. The motor and drive M-3 includes a driven shaft 99 having a rotating eccentric cam 100 attached thereto and engagable with the end of the device 92 remote from the pivot 98. Upon rotation of the cam 100, caused by a signal conducted to the motor and drive M-3 for this purpose from the machine programmer, the lobe thereon for each revolution, causes the device 92 and therefore the cam surface 97, to be moved into and out of the path of movement of the rollers 90, as the sorter 64 is rotated.

When in camming position, as shown in FIG. 5, the surface 97 is adapted to effect rotation of a gripper bar **89*e* counterclockwise against the bias of the springs 88 as the gripper actuating roller 90*e* rides upon the cam surface. To this end, the roller 90*e* engages the surface 97 and commences to rotate the gripper bar 89*e*. Continued rotation of the sorter 64 completes the full rotation of the gripper bar and corresponding movement of the gripper edge 86*e* away from the set S, as the set is moved adjacent the unload station 72 between the rollers 73, 74 of the unload transport system. At this position, the set S falls out of the bin 63 containing the same and upon the transport belt to be carried to the elevator tray 77 to be stacked thereon. Further rotation of the sorter moves the gripping actuating roller 90*f* away from the cam surface 97 to permit rotation of the gripper bar to its normal biased position for a bin 63** which has been emptied or unloaded.

Energization of the motor and drive M-3 to effect unloading of the bins 63 of bound sets of sheets is under control of the programmer P. During collation of the sets, the motor remains deenergized, thereby maintaining the camming device 92 inactive as the rotary sorter 64 rotates to receive the sheets in the sets. When collation of the sets has been completed, a signal to this effect is initiated, for example, by a counter which counts sheets entering the sorter at the transport 60 and which divides the total number of sheets by the number of bins 63, or by the programmed number of sets to be collated if less than the number of bins. This signal is transmitted to the machine programmer and, at a suitable point in time, generally starting from the first bound set, the motor M-3 is energized and remains energized until the sorter 64 is unloaded. Each revolution of the cam 100 is timed to the index movement of the sorter, one revolution per index or bin, so that rotation of the sorter, one bin movement and one rotation of the cam combine to produce unloading of the sorter, a bin at a time, and at the speed of rotation of the sorter which is utilized for loading the bins. In this manner, at certain times during a reproduction job, loading and unloading can occur simultaneously as the sorter rotates at the same constant speed.

As the completed, bound and unloaded sets are deposited on the tray 77, the same lowers, for example, by a height sensor and incremental actuation of a motor driving the screws 79. When the tray 77 is full and in its most lowered position, further unloading is terminated, and the tray automatically moves upward to its highest position, illustrated by dotted lines 110, (see FIG. 1) permitting the operator to remove the complete sets. When the sets have been removed, the tray automatically returns to its unloading position as shown.

The adhesive binding apparatus 70 includes an adhesive applicating roller 115 partially immersed in container 116 for adhesive material M. The container is mounted on a frame 117 which is movably mounted on the bed of the finishing apparatus 3 by a pair of roller races 119. A motor M-4 is also mounted on the frame 117 and is drivingly connected to the roller 115 when energized by a signal from the programmer P. Such signal is automatically initiated when adhesive binding has been programmed and the sets of sheets S have been completed and ready for binding.

Figure 8:
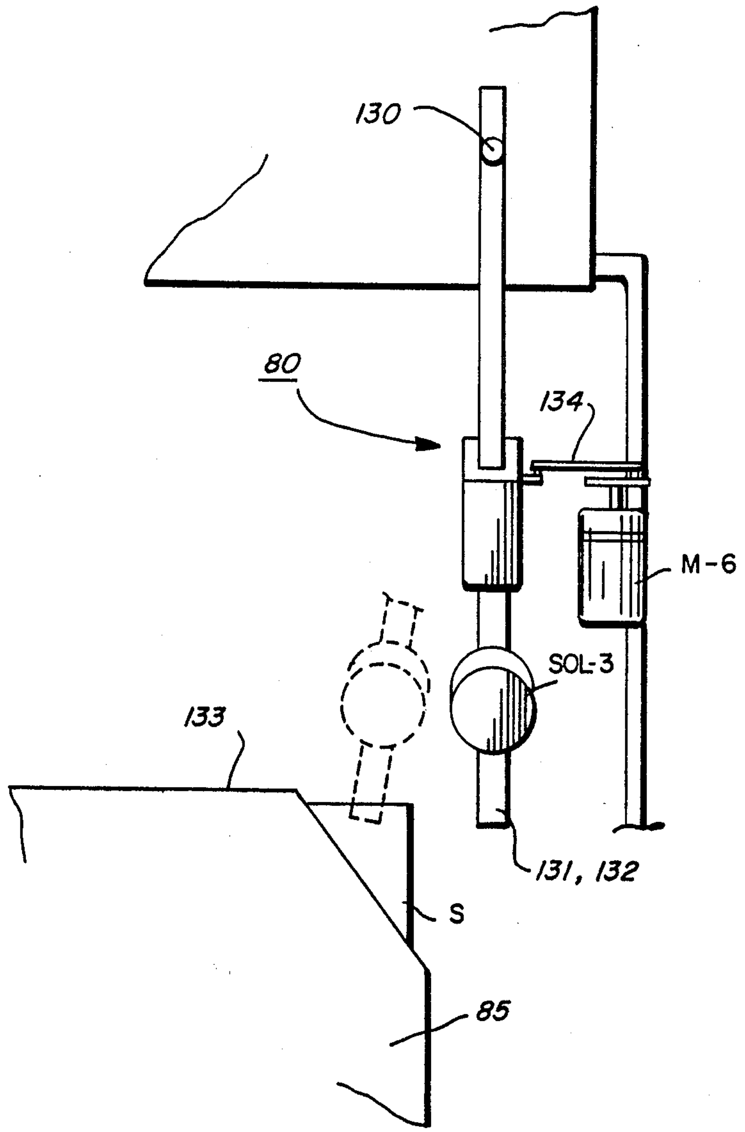
FIG. 8 is a partial plan view of the stapler/stitcher in its two operating positions.

Means, such as a motor M-5 and a crank system 120, are employed to move the roller 115 into and out of its position to apply adhesive material to the splines of the booklets or sets S. Upon energization of the motor M-5, by a signal from the progrmamer P, after the motor M-4 has been energized to drive the roller 115, the binding device 70 is moved into its operative position, as shown in FIG. 8. A pair of heaters 122 are suitably positioned under the container 116 for maintaining the adhesive material at a hot melt temperature best suited for entering the spline of each booklet to be absorbed therein. A signal from the programmer P is utilized to produce heating of the material and may be set to be instituted when the adhesive binding mode of operation has been programmed.

Figure 7:
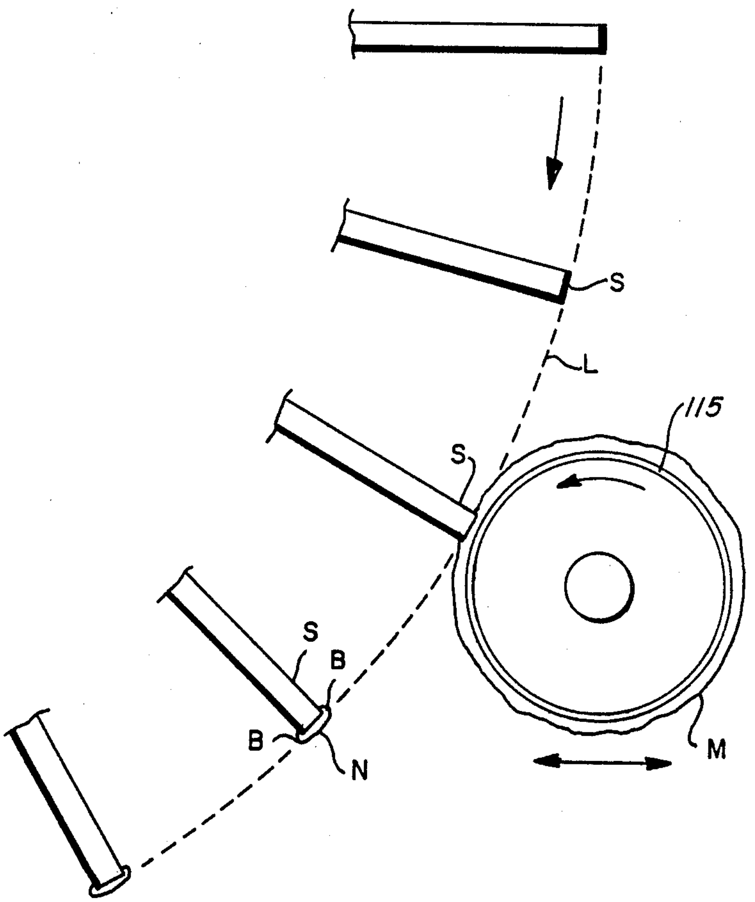
FIG. 7 is a schematic of portions of the sorter and the adhesive application roller applying material to the edges of booklets.

FIG. 7 is a schematic illustration depicting the application of adhesive material to the splines of completed booklets or set S. As the sorter 64 rotates, the edges of the booklets to which adhesive material is to be applied, define a circular path of movement illustrated by the dotted line L. The applicator roller 115 is movable toward this line during the adhesive binding mode in order to apply the material M, supported in the periphery of the roller, to the spline edge of each booklet. Each booklet is finished with a thin layer of adhesive material,. as illustrated by the reference numeral N, along the bound edge. The circular line of movement L is slightly spaced from the periphery of the roller 115 so that the adhesive material may be deposited with some thickness to the edge of the booklets. In addition, this arrangement provides beads of material B at both corners of the spline. In accomplishing best results, the peripheral speed of the roller 115 is made to equal approximately the peripheral speed of the splines of the booklets along the line L.

The stapler 80, as shown in FIG. 8, is mounted for pivotal movement on a pivot pin 130 suitably supported on the frame for the apparatus 3. The pin 130 is oriented at an angle relative to the horizon (see FIG. 1) so that the plane of pivotal movement for the stapler is such as to be coplanar or in alignment with each booklet to be stapled while in its radial orientation within the sorter 64. In this manner, the anvil 131 and stapling head 132 for the stapler will be arranged to receive a corner of the booklet at the proper stapling angle, and with sufficient clearance to avoid jamming. Each of the plates 85 associated with the gripper mechanism is formed with a notch 133 (see FIG. 4) at the rear ends thereof to receive the anvil 131 and head 132 of the stapler 80 during a stapling operation.

Movement of the stapler in its plane of pivotal movement is effected by a motor M-6 mounted on the frame for the apparatus 3. A crank mechanism 134 connected between the stapler and the frame produces pivotal movement of the stapler into and out of its stapling position for each indexing action by the sorter 64. When energized by a signal from the programmer P, the motor M-6 rotates the stapler 80 to position the anvil 131 and head 132 into the notch 133 as shown in dotted lines in FIG. 8. A solenoid SOL-3 mounted in the stapler 80 is then energized by a signal from the programmer P to produce a stapling operation. The motor M-6, still being energized, returns the stapler to its inoperative position away from the now rotating sorter 64. In operation, the motor M-6 remains energized during the entire reproduction job which includes stapling of completed booklets and the solenoid SOL-3 is intermittently energized for each stapling operation. The indexing rotative movement of the sorter 64 by the motor and drive M-2 is in timed relationship with the reciprocal movement of the stapler 80 between its inoperative and operative position by the motor M-6, and the energization of the solenoid SOL-3 to effect stapling. In this manner, productivity is maintained without pitch loss and very high speed production is available.

Figure 9:
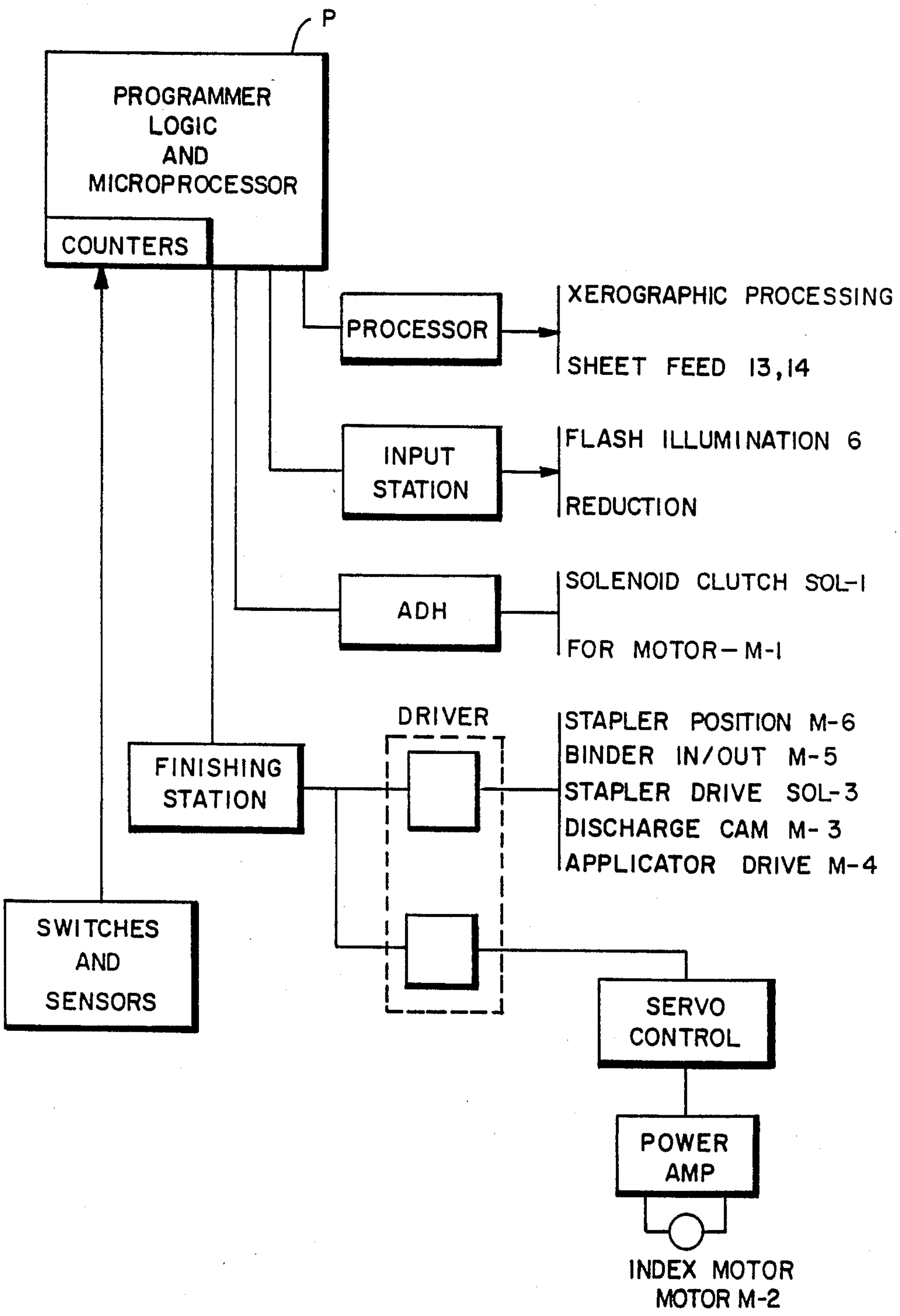
FIG. 9 is a block diagram of the control scheme for the printing system of FIG. 1.

FIG. 9 is a block diagram of a control arrangement for the reproduction and finisher system in FIG. 1. The programmer P is operatively connected to four remote: (1) the processor 1 for controlling the xerographic processing, copy sheet feed and movement, timing and monitoring and all other parameters in the processor; (2) the input station comprising the flash illumination system 6 and circuitry and copy size reduction of this feature is available; (3) the automatic document handling apparatus 2; and (4) the finishing station 3.

The finishing station 3 includes a driver operatively connected to a servo controller which, in turn, is connected to a power amplifier serving to energize and operate the rotary sorter indexing motor M-2. The remote for the finishing station 3 also includes drivers for the unload or discharge cam motor M-3, the adhesive applicator motor M-4, the adhesive binder positioning motor M-5, and the stapler positioning motor M-6.

Figure 10A:
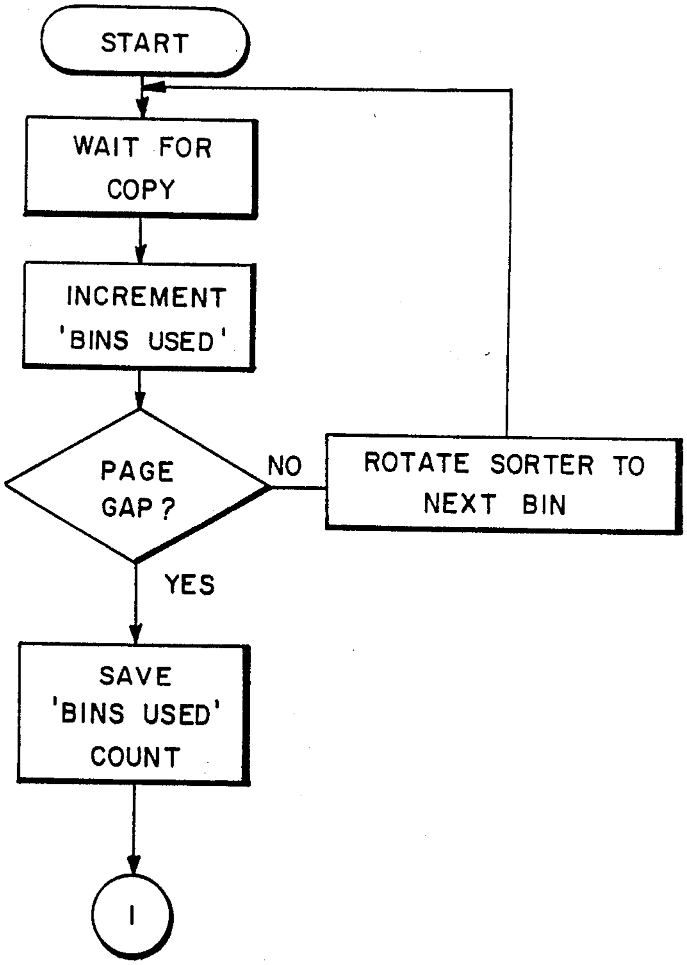
FIGS. 10*a*, 10*b*, and 10*c* are flow diagrams of the control function of the present invention.
Figure 10B:
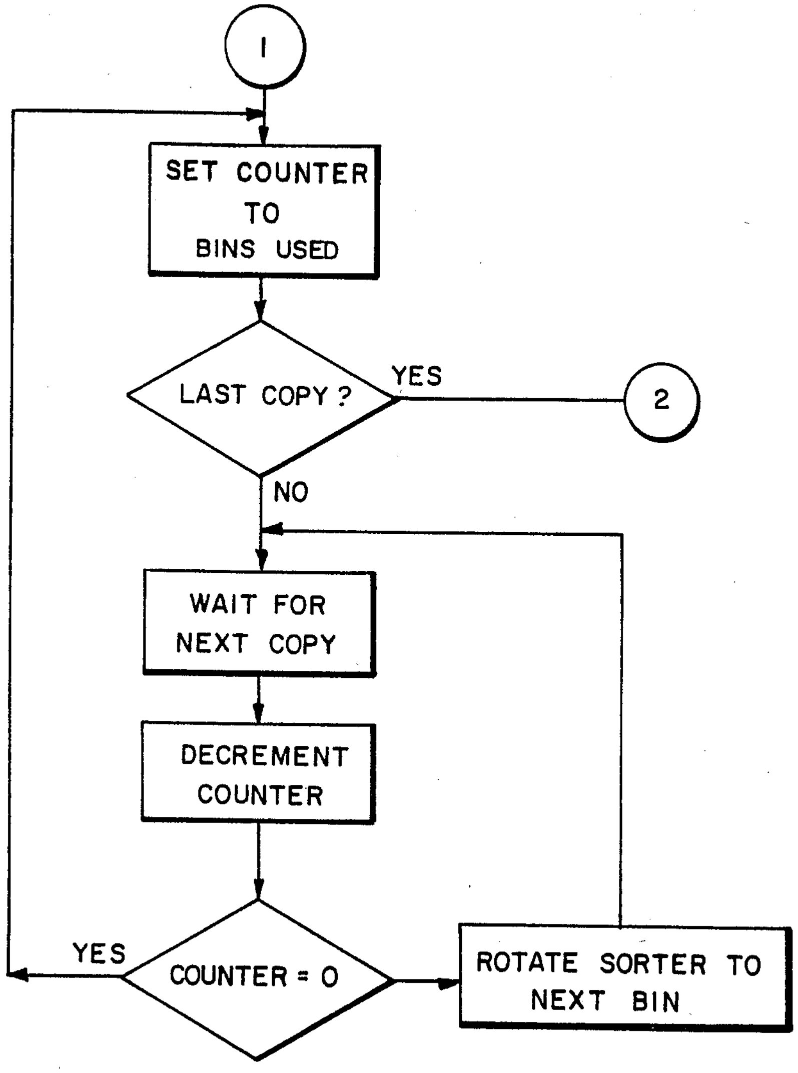
Figure 10C:
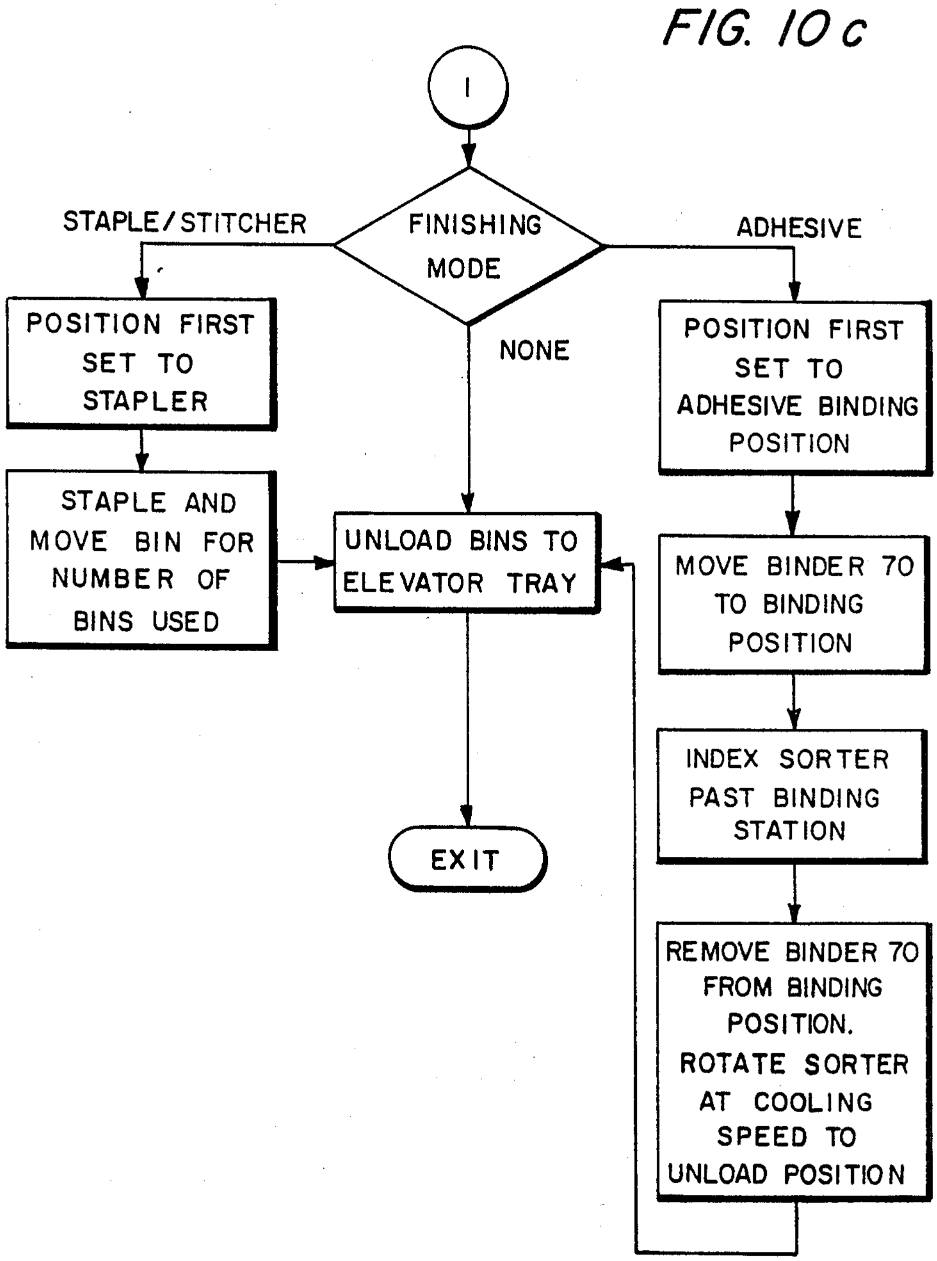

The flow diagram of FIGS. 10*a*, 10*b*, 10*c* depict operational control for the handling of the stream of copy sheets from the processor and document handling apparatus 2 as the sheets enter the finishing station 3. The stream comprises a series of multiple copies of the same document sheet which are collected in the rotary sorter 64. In FIGS. 10*a* and 10*b*, collation proceeds until completed for the document sheets in the apparatus 2 and depending upon the number of copy sets or booklets that were programmed and the number of bins in the sorter. If the programmed number of sets is less than the number of bins, then after the last bin receives the last sheet, the loading operation commences, as depicted in FIG. 10*c*. If the programmed number is larger than the number of bins, then after the bins are loaded with completed sets, the binding operation commences. After unloading of the entire sorter when binding has been completed, collation commences as before, and so on. Suitable sensors and switches are placed in the system to insure sheet counts and positioning for job timing.

From the foregoing, it will be apparent that an electrostatographic system with finishing station has been described which will produce adhesively bound collated sets at a high production rate without loss of throughput, in fact, at a rate in accordance with the full processing speed of the copy processing machine. Since copy machine/finishers employing document handling apparatus which recirculate document sheets on an individual basis are limited in their reproduction rate due to the mechanical limitations of the document apparatus, the present invention minimizes this limitation, so that still higher rates of reproduction are attainable in utilizing the principles of the invention.

While the invention has been described to the structure disclosed, it is not confined to the details set forth, but is intended to cover such modifications or changes as may come within the scope of the following claims.

We claim:

1. In a reproduction system having a processor for reproducing information to be copied on copy sheets and means for producing the information in the form of an individual light image for each copy sheet, each light image being produced a predetermined number of times in succession before a different succeeding light image is produced the same predetermined number of times, the improvement including:

a rotary sorter having sheet collecting bins arranged to receive copy sheets from the processor at a loading station and to collate the same into booklets, means for imparting rotation to said sorter relative to said loading station whereat a sheet is received in each of said bins, and a binding station adjacent said rotary sorter, said binding station having an adhesive binding device arranged to apply hot adhesive material to the spline of the booklets for binding the same.

2. The finishing apparatus of claim 1 including an unloading station at which the booklets are removed from the bins after a binding operation.

3. The finishing apparatus of claim 1 including a cooling device adjacent said rotary sorter and arranged to cool the hot adhesive material applied to the spline of each bound booklet.

4. In a reproduction system having a document handling apparatus adapted to transport individual document sheets from a supply stack to an exposure station and producing multiple exposures of each of the document sheets before returning the same to the supply stack, and a processor for reproducing copy sheets of the exposed document sheets, the combination of:

a rotary sorter arranged to receive the copy sheet output from the processor at a receiving station and to collate the same into booklets, means for imparting indexing rotation to said sorter relative to said loading station whereat a sheet is received for each indexing motion, and a binding station adjacent said rotary sorter, said binding station having an adhesive binding device arranged to apply hot adhesive material to the spline of the booklets for binding the same, said binding device being operative in timed relationship with the producing of the multiple exposures of the document sheets.

5. The reproduction system of claim 4 including control means for activating said adhesive binding device at the rate of each successive movement of said bins during the finishing mode of operation of the system.

6. The reproduction system of claim 4 including control means associated with said means for imparting indexing rotation for producing indexing rotation simultaneously with the activation of said binding device.

* * * * *